United States Patent
Martin et al.

(10) Patent No.: US 10,616,331 B1
(45) Date of Patent: Apr. 7, 2020

(54) MANAGING REMOTE REPLICATION IN STORAGE SYSTEMS

(71) Applicant: EMC IP HOLDING COMPANY LLC, Hopkinton, MA (US)

(72) Inventors: Owen Martin, Hopedale, MA (US); Malak Alshawabkeh, Franklin, MA (US); Benjamin A. Randolph, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 15/885,971

(22) Filed: Feb. 1, 2018

(51) Int. Cl.
    *G06F 13/00* (2006.01)
    *H04L 29/08* (2006.01)
    *H04L 12/24* (2006.01)

(52) U.S. Cl.
    CPC ........ *H04L 67/1095* (2013.01); *H04L 41/147* (2013.01); *H04L 67/1023* (2013.01); *H04L 67/1097* (2013.01); *H04L 41/142* (2013.01); *H04L 67/101* (2013.01)

(58) Field of Classification Search
    CPC ............ H04L 29/0854; H04L 67/1095; H04L 67/1023; H04L 41/147; H04L 67/1097; H04L 67/101; H04L 41/142; G06F 11/1662; G06F 11/1658; G06F 11/2053; G06F 11/2056
    USPC ................ 709/224, 223, 220–222, 227–229, 709/232–235
    See application file for complete search history.

(56) References Cited

U.S. PATENT DOCUMENTS

| | | | | |
|---|---|---|---|---|
| 7,499,453 | B2 * | 3/2009 | Carlson | H04L 12/2801 370/395.2 |
| 7,920,594 | B2 * | 4/2011 | Carlson | H04L 12/2801 370/468 |
| 7,970,011 | B2 * | 6/2011 | Carlson | H04L 12/2801 370/468 |
| 7,983,272 | B2 * | 7/2011 | Carlson | H04L 12/2801 370/395.4 |
| 2006/0120282 | A1 * | 6/2006 | Carlson | H04L 12/2801 370/229 |
| 2008/0037578 | A1 * | 2/2008 | Carlson | H04L 12/2801 370/463 |
| 2009/0207731 | A1 * | 8/2009 | Carlson | H04L 12/2801 370/232 |
| 2009/0213871 | A1 * | 8/2009 | Carlson | H04L 12/2801 370/462 |
| 2015/0052243 | A1 * | 2/2015 | Lumezanu | H04L 43/04 709/224 |

* cited by examiner

*Primary Examiner* — Kenneth R Coulter
(74) *Attorney, Agent, or Firm* — Krishnendu Gupta; Lesley Leonessa

(57) ABSTRACT

A method is used in managing remote replication in storage systems. The method monitors network traffic characteristics of a network. The network enables communication between a first storage system and a second storage system. The method predicts a change in at least one of an application demand of an application of a set of applications executing on the first storage server and a network state of the network, where the set of applications have been identified for performing a replication to the second storage system. Based on the prediction, the method dynamically manages replication of the set of applications in accordance with a performance target associated with each application.

16 Claims, 5 Drawing Sheets

MANAGING REMOTE REPLICATION IN STORAGE SYSTEMS

BACKGROUND

Technical Field

This application relates to managing remote replication in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by Dell or Dell EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Managing significant amounts of data requires data protection systems, such as data replication. Data replication protects data by creating a copy of the organization's production site data on a secondary backup storage system, and updating the backup with changes. The secondary backup storage system may be situated in the same physical location as the production storage system, or in a physically remote location (i.e., remote replication). In remote replication, the organization's production site and the secondary backup storage system may be connected through a network.

In some data storage systems, Service Level Objectives (SLOs) are established for applications executing on a server of the data storage system (i.e., the production site). The service level objective for each application may, for example, indicate an average response time range for the execution of the application. In response, the storage array dynamically allocates resources to meet the response time range.

SUMMARY OF THE INVENTION

In accordance with one aspect of the invention is a method used in managing remote replication in storage systems. The method monitors network traffic characteristics of a network, where the network enables communication between a first storage system and a second storage system. The method predicts a change in at least one of an application demand of an application of a set of applications executing on the first storage server and a network state of the network, where the set of applications have been identified for performing a replication to the second storage system. Based on the prediction, the method dynamically manages replication of the set of applications in accordance with a performance target associated with each application.

In accordance with another aspect of the invention is a system is used in managing remote replication in storage systems. The system monitors network traffic characteristics of a network, where the network enables communication between a first storage system and a second storage system. The system predicts a change in at least one of an application demand of an application of a set of applications executing on the first storage server and a network state of the network, where the set of applications have been identified for performing a replication to the second storage system. Based on the prediction, the system dynamically manages replication of the set of applications in accordance with a performance target associated with each application.

In accordance with another aspect of the invention, a computer program product comprising a computer readable medium is encoded with computer executable program code. The code enables execution across one or more processors for managing remote replication in storage systems. The code monitors network traffic characteristics of a network, where the network enables communication between a first storage system and a second storage system. The code predicts a change in at least one of an application demand of an application of a set of applications executing on the first storage server and a network state of the network, where the set of applications have been identified for performing a replication to the second storage system. Based on the prediction, the code dynamically manages replication of the set of applications in accordance with a performance target associated with each application.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
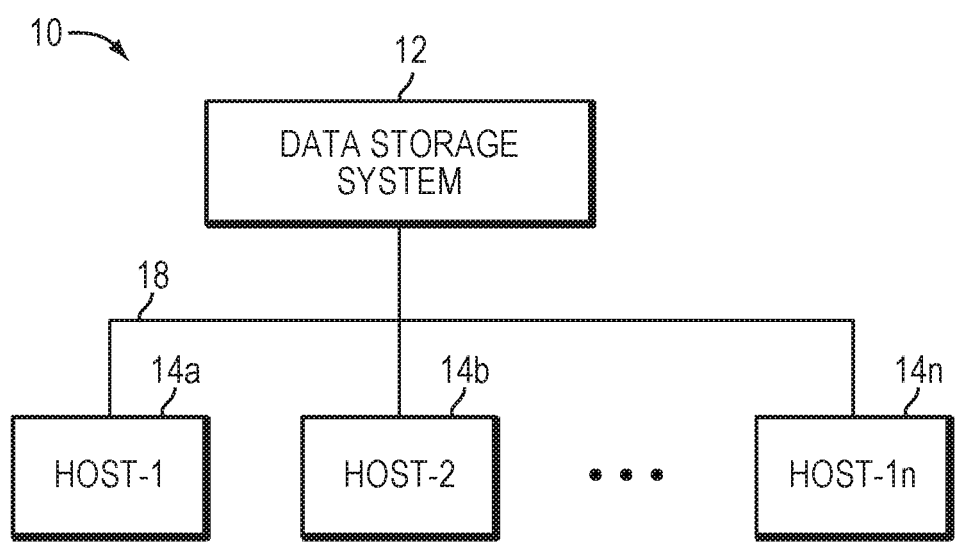
FIG. 1 is a simplified illustration of a computer system, in accordance with an embodiment of the present disclosure.

Described below is a technique for use in managing remote replication in storage systems, which technique may be used to provide monitoring network traffic characteristics of a network, where the network enables communication between a first storage system and a second storage system, predicting a change in at least one of an application demand of an application of a set of applications executing on the first storage server and a network state of the network, where the set of applications have been identified for performing a replication to the second storage system, and based on the prediction, dynamically managing replication of the set of applications in accordance with a performance target associated with each application.

As described herein, a method monitors network traffic between a production storage system, and a remote storage system where the production storage system is remotely replicated through a network. The method predicts a change in application demands of applications executing on the production storage system and/or the network traffic. Based on the predicted change, the method dynamically manages the replication on the physically remote location, by adjusting execution of applications executing on the production storage system according to service level objectives associated with the applications.

Conventional technologies cannot ensure that a storage system physically located at a remote location can meet service level objectives, for example, during a failover event. Conventional technologies do not take into account the performance targets of the production storage system during the remote replication process. Conventional technologies do not take into account the relative business priorities of applications, and do not prioritize traffic from the primary storage system to the remote storage system during replication. Conventional technologies do not provide a way to convey business priorities through an IP network during remote replication. Conventional technologies may attempt to address this issue by slowing down all applications when the network is in a busy state. However, in such a conventional system, there may be enough bandwidth on the system to meet the business needs of few critical applications. Thus, in such a conventional system, slowing down all applications instead of slowing down only few applications does not efficiently use the available bandwidth, and only results in the slowdown of all the applications.

By contrast, in at least some implementations in accordance with the current technique as described herein, a method manages remote replication in storage systems. In at least some implementations in accordance with the current technique as described herein, the method monitors network traffic characteristics of a network, where the network enables communication between a first storage system and a second storage system. The method predicts a change in at least one of an application demand of an application of a set of applications executing on the first storage server and a network state of the network, where the set of applications have been identified for performing a replication to the second storage system. Based on the prediction, the method dynamically manages replication of the set of applications in accordance with a performance target associated with each application.

In at least some implementations in accordance with the current technique described herein, the use of manages remote replication in storage systems technique can provide one or more of the following advantages: ensuring Recovery Time Objectives (RTO) and/or Recovery Point Objectives (RPO) for applications while taking into account network congestion and/or the relative business value of the applications executing on the primary storage system, and adjusting replication of such applications based on the state of the network, and/or the state of the applications executing on the primary storage system.

In contrast to conventional technologies, in at least some implementations in accordance with the current technique as described herein, a method monitors network traffic characteristics of a network, where the network enables communication between a first storage system and a second storage system. The method predicts a change in at least one of an application demand of an application of a set of applications executing on the first storage server and a network state of the network, where the set of applications have been identified for performing a replication to the second storage system. Based on the prediction, the method dynamically manages replication of the set of applications in accordance with a performance target associated with each application.

In an example embodiment of the current technique, when the method predicts the change in the network state, the method determines a predicted future state of the network indicating bandwidth availability for the network.

In an example embodiment of the current technique, when the method predicts the change in at least one of the application demand and the network state, the method predicts a probability that at least one of the application demand and network state will change.

In an example embodiment of the current technique, when the method predicts the probability, the method applies a statistical model to at least one of the application demand and network state.

In an example embodiment, the method updates the statistical model with the predicted change in at least one of the application demand and the network state.

In an example embodiment of the current technique, the first storage system indicates a primary storage system and the second storage system indicates a remote storage system, where data of the primary storage system is remotely replicated to the remote storage system.

In an example embodiment of the current technique, the network traffic characteristics of the network includes bandwidth of the network available to the set of applications.

In an example embodiment of the current technique, the set of applications include a subset of applications that are critical to a user of the first and second storage systems and a subset of applications that are less critical to the user of the first and second storage systems.

In an example embodiment of the current technique, when the method dynamically manages replication of the set of applications in accordance with the performance target, the method adjusts execution of at least one application of the set of application executing on the first storage system, based on the prediction of the change in at least one of the application demand and the network state.

In an example embodiment of the current technique, when the method adjusts the execution of at least one application of the set of applications, the method dynamically changes a latency of at least one application.

In an example embodiment of the current technique, when the method adjusts the execution of at least one application of the set of applications, the method delays performing replication for at least one application of the set of application to the second storage system by journaling write requests associated with at least one application on the first storage system in order to avoid impacting the performance target of at least one other application of the set of applications, where at least one other application has a different priority in comparison with at least one application.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a 14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, FICON, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2:
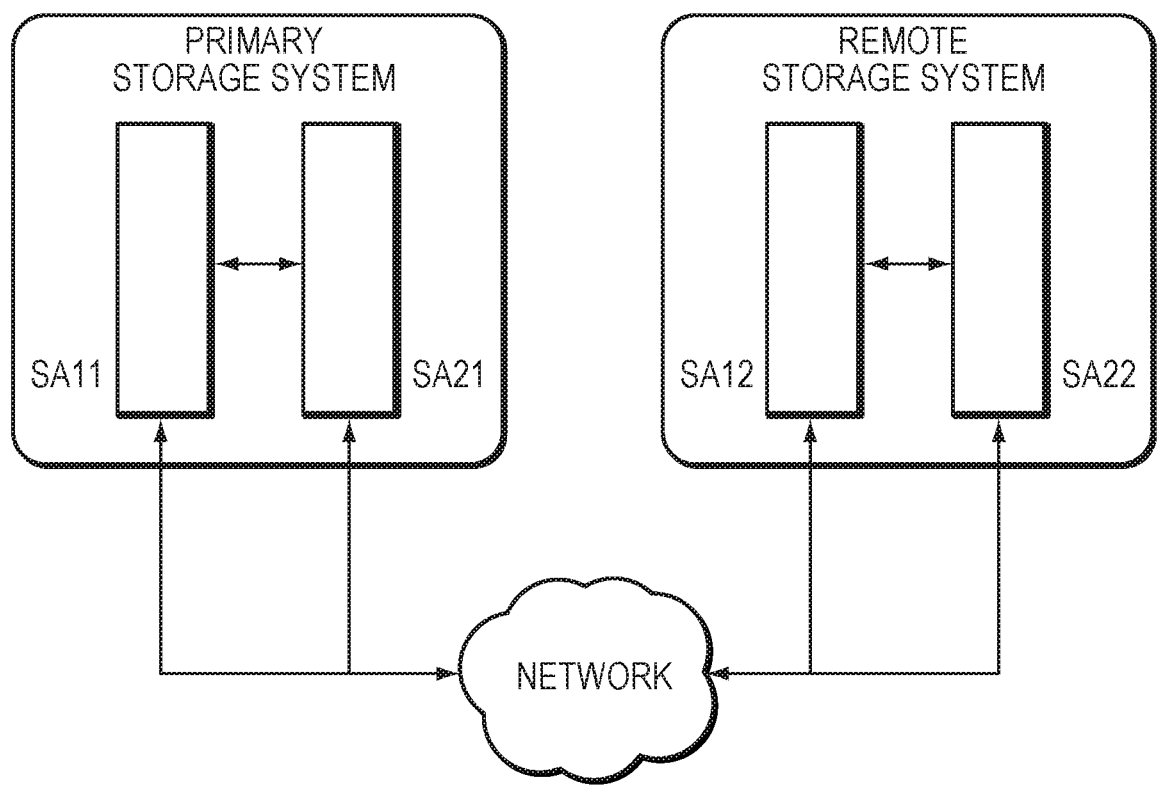
FIG. 2 is an example illustration of remote replication of a storage system, in accordance with an embodiment of the present disclosure.

Referring now to FIG. 2, shown is an example illustration of remote replication of a storage system that may be used in connection with performing the technique or techniques described herein. A primary storage system (i.e., a production site) has two local storage arrays, SA11 and SA21, for example, for redundancy. However, it should be noted that the primary storage system may have one or more local storage arrays. The primary storage system is connected to a remote storage system through an IP network for remote replication. Such IP network may be public network or private network. The remote storage system also has two remote storage arrays SA12 and SA22, for example, for site availability. However, it should be noted that the remote storage system may have one or more remote storage arrays.

Remote replication may be performed either synchronously or asynchronously. Synchronous replication writes data to the organization's primary storage system and remote storage system at the same time. With synchronous replication, every time an application writes data, that data is sent, for example, from the organization's primary storage system to the remote storage system, and then the primary storage system waits for a reply from the remote storage system. With asynchronous replication, there is a delay before the data gets written to the remote storage system.

Data replication systems generally operate either at the application level, at the file system level, at the hypervisor level or at the data block level. In large scale environments, remote replication Recovery Time Objectives (RTO) and Recovery Point Objectives (RPO) provide a baseline requirement for data recovery and/or application availability. Large scale environments, such as enterprise storage environments, have the highest demands for RTO and RPO which typically includes storage systems located at disparate physical locations. Data recovery is the process of restoring a previous copy of the data and applying logs or other necessary processes to that copy to bring it to a known point of consistency.

The RTO is the maximum amount of time allowed for data to recover or application to restart to a specified point of consistency. Thus, RTO indicates how long a user can operate without a specific application which is associated with the maximum allowable or maximum tolerable outage for such user. This time involves many factors. For example, the time taken to provision physical environmental requirements, provision servers with the application and database software, configure the network, restore the data at the new site, roll the data forward to a known point of consistency, and validate the data.

The RPO indicates the acceptable amount of data, measured in units of time that may be lost in a failure and indicates a point of consistency to which a user wants to recover or restart. It is measured in the amount of time from when the point of consistency was created or captured, to the time the failure occurred. This time equates to the acceptable amount of data loss. Zero data loss (i.e., no loss of committed transactions from the time of the failure) is the ideal goal, but the high cost of implementing such a solution must be weighed against the business impact and cost of a controlled data loss. Some organizations, like banks, have zero data loss requirements. The database transactions entered at one location must be replicated immediately to another location. This can have a performance impact on the respective applications when the two locations (i.e., the primary storage system and the remote storage system) are located far apart. Defining the required RPO is usually a compromise between the needs of the business, the cost of the solution, and the probability of a particular failure event.

While such an environment as illustrated in FIG. 2 is highly capable for performing a remote replication, it is often required only for mission critical applications, while other applications may not need such a high cost solution. In at least one embodiment of the current technique, Service Levels Objectives are managed during a remote replication by leveraging the customer's knowledge of relative business value of different applications executing in such customer's environment to ensure that the RTO and RPO for such applications are met. Further, in at least one embodiment of the current technique, network characteristics of IP network are monitored and a statistical model is used for predicting network congestion and application demand. Thus, the goal of the current invention is to allow less critical applications to scale back their RTO/RPO temporarily in order to meet the mission critical needs of an enterprise by providing the available network bandwidth to applications that are critical for the enterprise.

Figure 3:
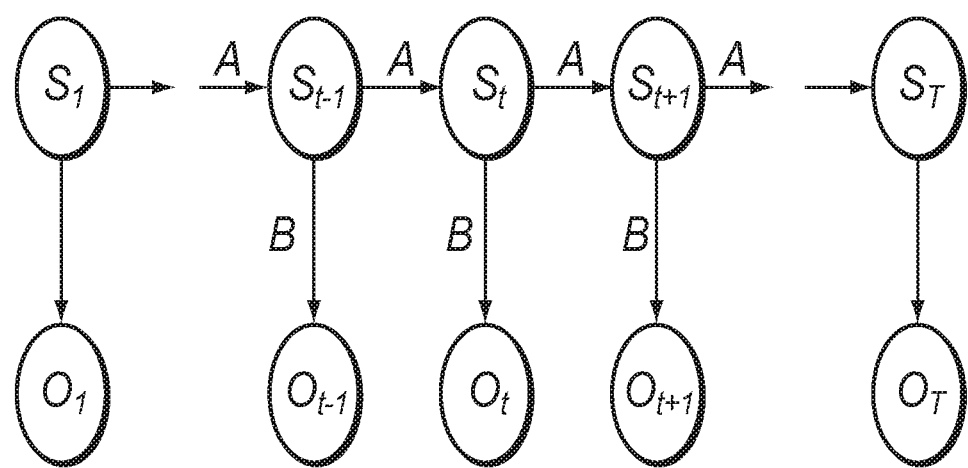
FIG. 3 is an example illustration of a statistical model applied to the application state and/or the network state, in accordance with an embodiment of the present disclosure.

FIG. 3 illustrates an example of a statistical model applied to the application state and/or the network state. In an example embodiment, a statistical model, for example, a Hidden Markov Model (HMM) is employed to predict network congestion, and/or application demand. HMM is a statistical model that is derived from Markov Model, and is used extensively for performance modeling and performance prediction analysis. The HMM may predict the future state of a target system, such as an application executing on the primary storage system, based on the application's current state.

As illustrated in FIG. 3, the circles indicate states, and the arrows indicate probabilistic dependencies between states. States $S_1$ through $S_T$ illustrate hidden states. Each hidden state is dependent on the previous state. The nodes $O_1$ through $O_T$ is dependent on their respective corresponding hidden state.

In an example embodiment, two states are defined; "normal" and "busy". In an example embodiment, the method monitors, for example, 10 different IO density levels (i.e., 100, 500, 1000, etc.). For a particular hidden state sequence, for example, $S_1, S_2 \ldots S_T$, and an observation sequence $O_1, O_2 \ldots O_T$, the method computes the probability of a given observation sequence, and given an observation sequence, the method computes the most likely hidden state sequence.

Figure 4:
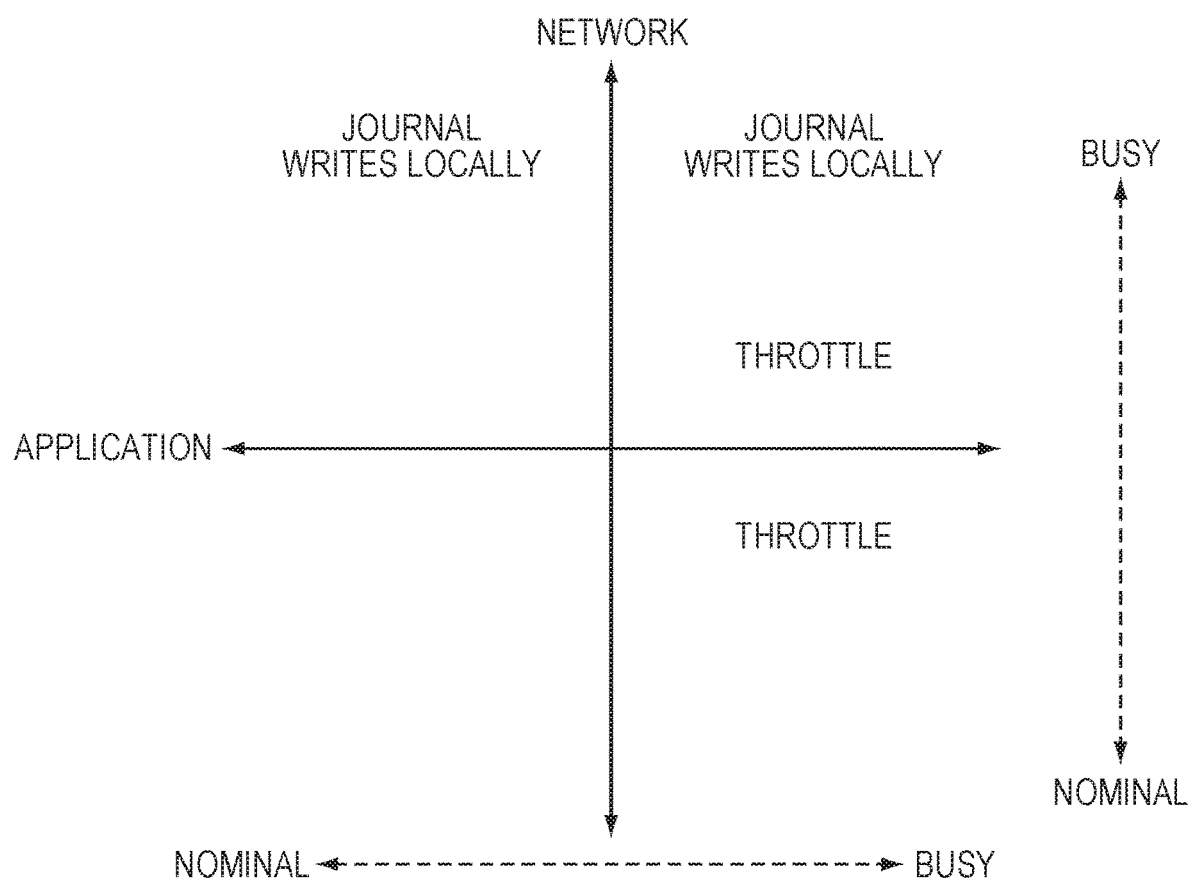
FIG. 4 is an example of a decision making diagram that may be used in connection with techniques disclosed herein.

FIG. 4 illustrates an example of a decision making diagram according to embodiments disclosed herein. In an example embodiment, when the state of the network is predicted to transition from "normal" to "busy", the method may journal writes locally on the primary storage system, and then replicate them to the remote storage system at a later time. In another example embodiment, when the state of the application demand is predicted to transition from "normal" to "busy", the method may apply a latency to some applications that have a lower business priority so that applications with a higher business priority have the throughput they require to meet their RTO and/or RPO. In yet another example embodiment, when the state of the application demand is predicted to transition from "normal" to "busy", and state of the network is predicted to transition from "normal" to "busy", the method may journal writes locally, and may also apply a latency to some applications that have a lower business priority so that applications with a higher business priority have the throughput they require to meet their RTO and/or RPO.

Figure 5:
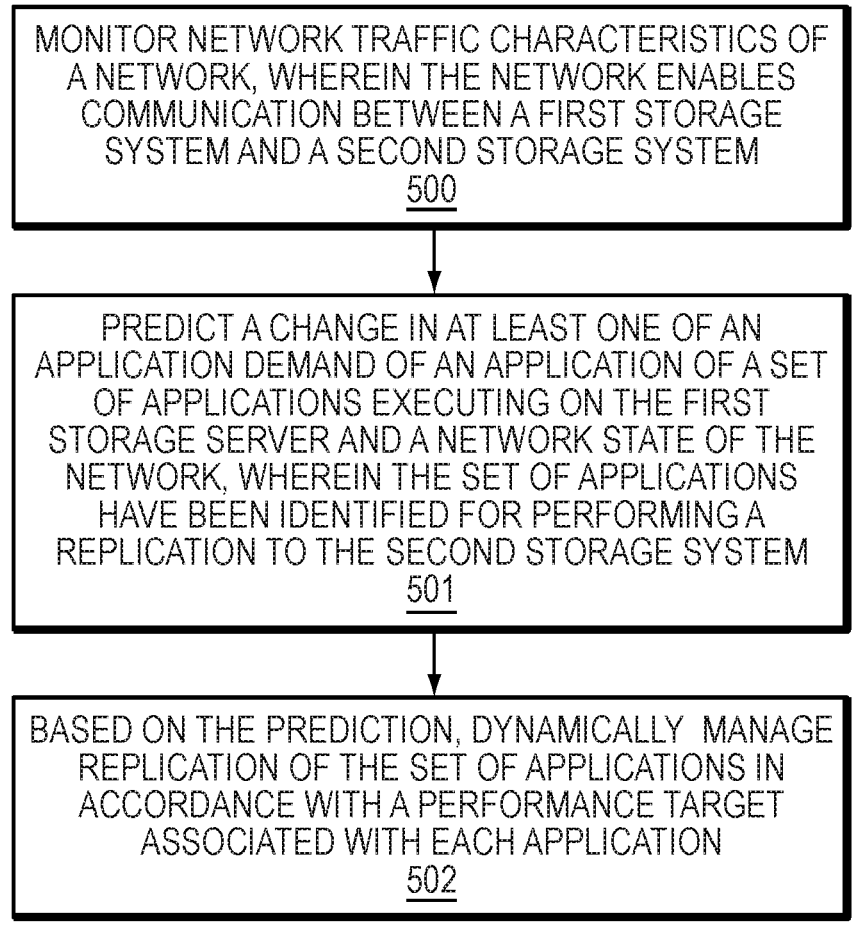
FIG. 5 is a flow diagram illustrating processes that may be used in connection with techniques disclosed herein.

Referring to FIG. 5, shown is a more detailed flow diagram illustrating managing remote replication in storage systems. With reference also to FIGS. 1-4, the method monitors network traffic characteristics of a network, where the network enables communication between a first storage system and a second storage system (Step 500). In an example embodiment, the first storage system indicates a primary storage system and the second storage system indicates a remote storage system, where data of the primary storage system is remotely replicated to the remote storage system as illustrated in FIG. 1. In an example embodiment, the network traffic characteristics of the network include the bandwidth of the network available to the set of applications.

In an example embodiment, the method predicts a change in at least one of an application demand of an application of a set of applications executing on the first storage server and a network state of the network, where the set of applications have been identified for performing a replication to the second storage system (Step 501).

In an example embodiment, based on the prediction, the method dynamically manages replication of the set of applications in accordance with a performance target associated with each application (Step 502). In an example embodiment, the performance targets indicate Service Level Objectives associated with the application executing on the server. In an example embodiment, a customer may choose a response time range for the application executing on the server. The response time range is associated with a Service Level Objective. The storage array dynamically allocates storage resources to meet the response time range indicated by the Service Level Objective.

In an example embodiment, when the method predicts the change in the network state, the method determines a predicted future state of the network indicating bandwidth availability for the network. For example, the method may determine that the predicted state of the remote storage system is transitioning to a "busy" state, meaning, for example, there is a risk that some applications may not meet their RTO and/or RPO, and/or there is high congestion on the IP network.

In an example embodiment, when the method predicts the change in at least one of the application demand and the network state, the method predicts a probability that at least one of the application demand and network state will change. In an example embodiment, when the method predicts the probability, the method applies a statistical model to at least one of the application demand and network state. As illustrated in FIG. 3, a statistical model, such as HMM may be used. In this example embodiment, the method uses the output of the HMM to proactively predict the future state of the application demand on the remote storage system. For example, using the statistical model, the method may determine that the predicted state of the remote storage system is transitioning to a "normal" state, meaning the remote storage system is predicted to be less capable of handling replication from the primary storage system to the remote storage system. In another example embodiment, as noted above, the method may determine that the predicted state of the remote storage system is transitioning to a "busy" state, meaning, for example, there is a risk that some applications may not meet their RTO and/or RPO, and/or there is high congestion on the IP network.

In an example embodiment, the method updates the statistical model with the predicted change in at least one of the application demand and the network state. For example, the statistical model may be a machine learning system, where the method updates the statistical model with the values of the probabilities determined by the method, where the probabilities indicate how likely is the transitions of the states of the application demand and/or the state of network congestion.

In an example embodiment, the set of applications includes a subset of applications that are critical to a user of the first and second storage systems and a subset of applications that are less critical to the user of the first and second storage systems. In an example embodiment, the user of a large scale enterprise has knowledge of both types of the applications executing on the primary storage system as well as the business value of those applications, and the relative business value of each application with respect to the other applications. Thus, the user may determine that some applications are more critical than other applications, and some applications are less critical than other applications.

In an example embodiment, when the method dynamically manages replication of the set of applications in accordance with the performance target, the method adjusts execution of at least one application of the set of application executing on the first storage system, based on the prediction of the change in at least one of the application demand and the network state. In an example embodiment, when the method predict a change in application demand and/or network state, the method takes into account the user's knowledge of the applications business value, through the use of Service Level Objectives (SLO), and adjusts execution of at least one application executing on the primary storage system to ensure that the RTO and RPO needs of the user are met.

In an example embodiment, when the method adjusts the execution of at least one application of the set of applications, the method dynamically changes a latency of at least one application. In an example embodiment, the method determines that the predicted state of the remote replication system is transitioning to "normal". In this example embodiment, the method may introduce artificial delays into the service level (for example, for lower priority applications) to insure that applications with a higher priority have the throughput they require, for example, to achieve the desired RTO and RPO.

In an example embodiment, when the method adjusts the execution of at least one application of the set of applications, the method delays performing replication for at least one application of the set of application to the second storage system by journaling write requests associated with at least one application on the first storage system. The method does this to avoid impacting the performance target of at least one other application of the set of applications, where at least one other application has a different priority in comparison with at least one application. For example, a banking application may have a higher priority than other applications executing on the primary or remote storage system. One application may have a slower RTO and/or RPO than another application. In an example embodiment, the method determines that the predicted state of the remote replication system is transitioning to "busy". In this example embodiment, the method may increase throughput for high priority applications by dynamically determining that less critical applications journal writes locally, for example, using Symmetrix Native Ordered Writes (SNOW) which journals the write operations in an ordered manner such that the write operations are applied to a remote storage system in the same order in which the write operations was received. Thus, the method scales back the RTO and/or RPO of less critical applications temporarily to meet the mission critical needs of the high priority applications. In other words, when the method determines that the state has transitioned to "busy", the method scales back execution of lesser priority applications to ensure that high priority applications meet their SLOs. In another example embodiment, if the network connection between the primary storage system and the remote storage system is interrupted, the method will journal writes locally. When the network link is reestablished, the method replicates to the remote storage system the data that was stored in a local buffer.

There are several advantages to embodiments disclosed herein. For example, the method takes into account the unpredictable nature of network congestion to ensure that SLOs are met during replication. The method ensures higher priority applications meet their RTO and/or RPO. The method applies the business value of the applications that are executing on the primary storage system to adjust execution of the applications to meet RTO and/or RPO for such applications.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing remote replication in storage systems, the method comprising:
    monitoring network traffic characteristics of a network, wherein the network enables communication between a first storage system and a second storage system;
    predicting a change in at least one of an application demand of an application of a set of applications executing on the first storage server and a network state of the network, wherein the set of applications have been identified for performing a replication to the second storage system; and
    based on the prediction, dynamically managing replication of the set of applications in accordance with a performance target associated with each application by adjusting execution of at least one application of the set of application executing on the first storage system, based on the prediction of the change in at least one of the application demand and the network state, wherein the adjusting comprises delaying performing replication for the at least one application of the set of application to the second storage system by journaling write requests associated with the at least one application on the first storage system in order to avoid impacting the performance target of at least one other application of the set of applications, wherein the at least one other application has a different priority in comparison with the at least one application.

2. The method of claim 1, wherein predicting the change in the network state comprises determining a predicted future state of the network indicating bandwidth availability for the network.

3. The method of claim 1, wherein the prediction of the change in at least one of the application demand and the network state comprises predicting a probability that at least one of the application demand and network state will change.

4. The method of claim 3, wherein predicting the probability comprises:
    applying a statistical model to at least one of the application demand and network state; and
    updating the statistical model with the predicted change in at least one of the application demand and the network state.

5. The method of claim 1, wherein the first storage system indicates a primary storage system and the second storage system indicates a remote storage system, wherein data of the primary storage system is remotely replicated to the remote storage system.

6. The method of claim 1, wherein the network traffic characteristics of the network includes bandwidth of the network available to the set of applications.

7. The method of claim 1, wherein the set of applications include a subset of applications that are critical to a user of the first and second storage systems and a subset of applications that are less critical to the user of the first and second storage systems.

8. The method of claim 1, wherein adjusting the execution of the at least one application of the set of applications comprises:
    dynamically changing a latency of the at least one application.

9. A system for use in managing remote replication in storage systems, the system comprising a processor configured to:
    monitor network traffic characteristics of a network, wherein the network enables communication between a first storage system and a second storage system;
    predict a change in at least one of an application demand of an application of a set of applications executing on the first storage server and a network state of the network, wherein the set of applications have been identified for performing a replication to the second storage system; and
    based on the prediction, dynamically manage replication of the set of applications in accordance with a performance target associated with each application by adjusting execution of at least one application of the set of application executing on the first storage system, based on the prediction of the change in at least one of the application demand and the network state, wherein the adjusting comprises delaying performing replication for the at least one application of the set of application to the second storage system by journaling write requests associated with the at least one application on the first storage system in order to avoid impacting the performance target of at least one other application of the set of applications, wherein the at least one other application has a different priority in comparison with the at least one application.

10. The system of claim 9, wherein the processor configured to predict the change in the network state is further configured to:
determine a predicted future state of the network indicating bandwidth availability for the network.

11. The system of claim 9, wherein the processor configured to predict the change in at least one of the application demand and the network state is further configured to predict a probability that at least one of the application demand and network state will change.

12. The system of claim 11, wherein the processor configured to predict the probability is further configured to:
apply a statistical model to at least one of the application demand and network state; and
update the statistical model with the predicted change in at least one of the application demand and the network state.

13. The system of claim 9, wherein the first storage system indicates a primary storage system and the second storage system indicates a remote storage system, wherein data of the primary storage system is remotely replicated to the remote storage system.

14. The system of claim 9, wherein the set of applications include a subset of applications that are critical to a user of the first and second storage systems and a subset of applications that are less critical to the user of the first and second storage systems.

15. The system of claim 9, wherein the processor configured to adjust the execution of the at least one application of the set of applications is further configured to:
dynamically change a latency of the at least one application.

16. A computer program product for managing remote replication in storage systems, the computer program product comprising:
a non-transitory computer readable storage medium having computer executable program code embodied therewith, the program code executable by a computer processor to:
monitor network traffic characteristics of a network, wherein the network enables communication between a first storage system and a second storage system;
predict a change in at least one of an application demand of an application of a set of applications executing on the first storage server and a network state of the network, wherein the set of applications have been identified for performing a replication to the second storage system; and
based on the prediction, dynamically manage replication of the set of applications in accordance with a performance target associated with each application by adjusting execution of at least one application of the set of application executing on the first storage system, based on the prediction of the change in at least one of the application demand and the network state, wherein the adjusting comprises delaying performing replication for the at least one application of the set of application to the second storage system by journaling write requests associated with the at least one application on the first storage system in order to avoid impacting the performance target of at least one other application of the set of applications, wherein the at least one other application has a different priority in comparison with the at least one application.

* * * * *